United States Patent [19]

Hasegawa

[11] Patent Number: 5,270,855
[45] Date of Patent: Dec. 14, 1993

[54] MICROSCOPE HAVING A FOCUS-ADJUSTING MECHANISM

[75] Inventor: Takashi Hasegawa, Tokyo, Japan

[73] Assignee: Olympus Optical Co., Ltd., Tokyo, Japan

[21] Appl. No.: 792,164

[22] Filed: Nov. 14, 1991

[30] Foreign Application Priority Data

Nov. 19, 1990 [JP] Japan .................. 2-313583

[51] Int. Cl.⁵ .................. G02B 21/00; G02B 21/26
[52] U.S. Cl. .................. 359/368; 359/383; 359/392
[58] Field of Search ........ 359/372, 368, 369, 379–384, 359/391–395, 385, 388; 280/201, 203; 250/201.2–201.4

[56] References Cited

U.S. PATENT DOCUMENTS

| | | | |
|---|---|---|---|
| 3,721,827 | 3/1973 | Reinheimer | 359/392 |
| 3,984,678 | 10/1976 | Uchiyama et al. | 359/392 |
| 4,367,914 | 1/1983 | Mukasa | 359/392 |
| 4,427,270 | 1/1984 | Kraft et al. | 359/368 |
| 4,445,758 | 5/1984 | Emmel | 359/392 |
| 4,660,942 | 4/1987 | Hill | 359/383 |
| 4,756,611 | 7/1988 | Yonekubo et al. | 359/388 |
| 4,769,530 | 9/1988 | Miyahara | 359/383 |
| 4,902,101 | 2/1990 | Fujihara et al. | 359/383 |
| 5,000,555 | 3/1991 | Sato | 359/392 |
| 5,175,644 | 12/1992 | Dosaka | 359/392 |

FOREIGN PATENT DOCUMENTS 3641048 6/1987 Fed. Rep. of Germany .
3735091 4/1988 Fed. Rep. of Germany .

OTHER PUBLICATIONS

Patent Abstracts of Japan, vol. 10, No. 12, Jan. 7, 1986, Optical Apparatus.

*Primary Examiner*—Bruce Y. Arnold
*Assistant Examiner*—Thong Neuyen
*Attorney, Agent, or Firm*—Frishauf, Holtz, Goodman & Woodward

[57] ABSTRACT

A microscope which comprises a main unit comprising a base, an arm body mounted on and fixed to the base, an arm top, a revolver attached to the arm top, an objective attached to the revolver, a lens barrel held by the arm top, and an eyepiece attached to the lens barrel, a stage for supporting a specimen, a movable member connected to the front of the arm body, opposing the specimen supported on the stage, and capable of moving in a vertical direction, a revolver/ stage holder attached to the movable member, for holding the revolver or the stage, a focus adjustment knob coupled to the arm body, a focus-adjusting mechanism located within the arm body and mechanically connected to the movable member and the focus adjustment knob, for moving the movable member in the vertical direction for a distance proportional to an angle through which the knob is rotated, a first revolver holder secured to the arm top, for holding the revolver, and a stage support to be mounted on the base in the case where the objective is moved in order to achieve focusing.

15 Claims, 5 Drawing Sheets

MICROSCOPE HAVING A FOCUS-ADJUSTING MECHANISM

BACKGROUND OF THE INVENTION

1. Field of the Invention

The present invention relates to a microscope, and more particularly to an improved focus-adjusting mechanism for use in a microscope.

2. Description of the Related Art

Various focus-adjusting mechanisms are used in microscopes. Four microscopes, each having a focus-adjusting mechanism, will be described with reference to FIGS. 9 to 12.

Figure 9:
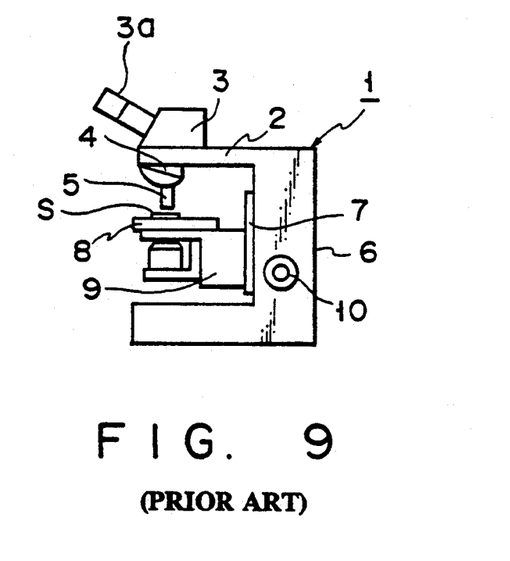
FIG. 9 shows a microscope having a first conventional focus-adjusting mechanism.

The microscope shown in FIG. 9 comprises a main unit 1, a lens barrel 3, a revolver 4, and an objective 5. The main unit 1 has an arm top 2 and arm body 6. The barrel 3 is connected at its lower end to the arm top 2 and has an eyepiece 3a fixed to its upper end. The revolver 4 is also connected to the arm top 2. The objective is fixed to the revolver 4. The eyepiece 3a and the objective 5 are placed in the same viewing axis. The microscope further comprises a movable support 7, a stage 8, a stage holder 9, a focus adjustment knob 10, and a focus-adjusting mechanism (not shown). The movable support 7 is mounted on the front of the arm body 6 and can slide up and down, in parallel to the viewing axis. The stage 8 is held by the holder 9, which is fastened to the support 7. The focus adjustment knob 10 is mounted on one side of the arm body 6. The focus-adjusting mechanism is housed within the arm body 6 and connected to the, focus adjustment knob 10. In operation, a specimen S is put on the stage 8 and placed on the viewing axis. Then, the knob 10 is rotated, thus driving the focus-adjusting mechanism. The focus-adjusting mechanism moves the support 7 vertically. As a result, the stage 8 is moved up or down, bringing the specimen S to the focal point of the objective 5.

Figure 10:
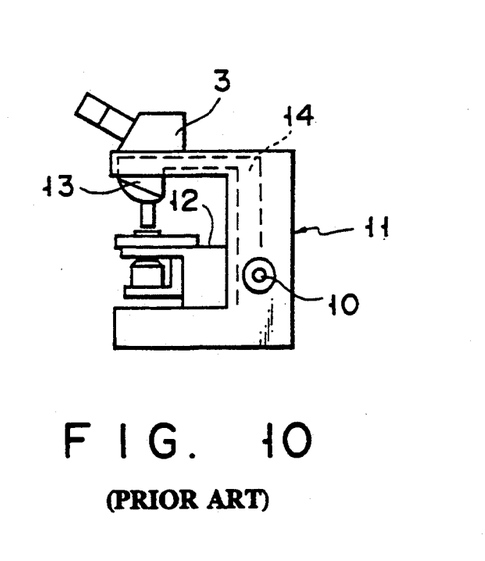
FIG. 10 shows a microscope having a second conventional focus-adjusting mechanism.

The microscope shown in FIG. 10 is characterized in two respects. First, the stage holder 12 is immovably secured to the main unit 11. Second, the focus adjustment knob 10 and the revolver 13 are coupled to the focus-adjusting mechanism 14 housed within the main unit 11. Hence, as the knob 10 is rotated, the revolver 13 having an objective is moved vertically, whereby the focal point of the objective is moved to the specimen S.

Figure 11:
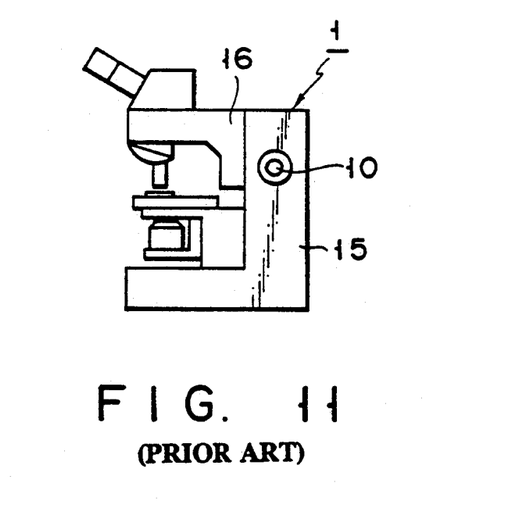
FIG. 11 shows a microscope having a third conventional focus-adjusting mechanism.

The microscope shown in FIG. 11 is characterized in that the arm top 16 is slidably attached to the arm body 15 of the main body 1. As the focus adjustment knob 10 is rotated, the arm top 16 is moved up or down, whereby the focal point of the objective is moved to the specimen S.

Figure 12:
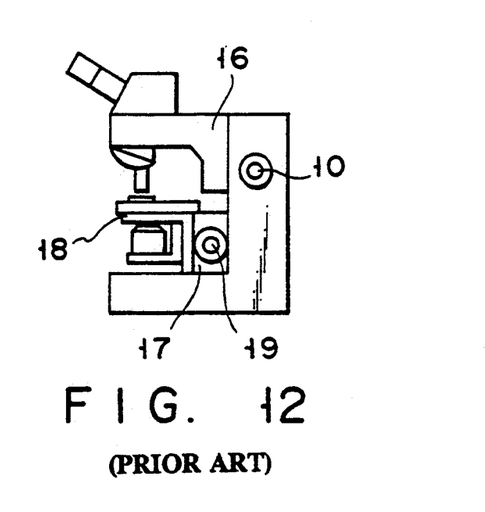
FIG. 12 shows a microscope having a fourth conventional focus-adjusting mechanism.

The microscope shown in FIG. 12 is identical to the microscope of FIG. 11, except for in three respects. First, a fixed support 17 containing an auxiliary focus-adjusting mechanism (not shown) is fastened to the main unit 1. Second, an auxiliary focus adjustment knob 19 is mounted on one side of the support 17 and connected to the auxiliary focus adjustment mechanism. Third, the stage holder 18 is slidably attached to the fixed support 17 and driven by the auxiliary focus-adjusting mechanism. Hence, the objective and the stage are independently moved vertically when the knobs 10 and 19 are rotated.

In the microscope shown in FIG. 9, the stage 8 can have but limited size and rigidity since it is supported by a pole guide or a roll guide and is moved vertically to accomplish focus adjustment. Hence, the stage 8 cannot support a relatively heavy specimen, and is likely to be deformed, which results in various problems in microscopic observation.

The microscope shown in FIG. 10, wherein the objective is moved up and down to achieve focusing, is disadvantageous. The distance between the objective and the lens barrel 3 is long unless the objective is an infinity type. Consequently, various optical deteriorations such as insufficiency of ambient light occur, making it impossible for the microscope to have an adequate focusing stroke.

In the microscopes shown in FIGS. 11 and 12, the arm top 16 can have but limited rigidness since it is moved vertically to effect focus adjustment. Thus, it would be impossible to mount a camera on the top arm.

SUMMARY OF THE INVENTION

The object of the present invention is to provide a microscope having a focus-adjusting mechanism, in which either the specimen-supporting section or the objective-supporting section can be moved in order to achieve focus adjustment, and which enables a user to observe specimens of various weights in a desired magnification.

According to the invention, there is provided a microscope which comprises: main unit comprising a base, an arm body mounted on and fixed to the base, an arm top, a revolver attached to the arm top, an objective attached to the revolver, a lens barrel held by the arm top, and an eyepiece attached to the lens barrel; a stage for supporting a specimen; a movable member connected to the front of the arm body, opposing the specimen supported on the stage, and capable of moving in a vertical direction; a revolver/stage holder attached to the movable member for selectively holding one of the revolver or the stage; a focus adjustment knob coupled to the arm body; a focus-adjusting mechanism located within the arm body and mechanically connected to the movable member and the focus adjustment knob, for moving the movable member in the vertical direction for a distance proportional to an angle through which the knob is rotated; a first revolver holder secured to the arm top, for holding the revolver; and a stage support to be mounted on the base in the case where the objective is moved in order to achieve focusing.

In the microscope of the invention, either the objective or the stage is moved vertically to achieve focusing.

To move the objective vertically, first the holder holding the revolver is attached to the movable member, and then the stage is mounted on the base. Next, the focus adjustment knob is rotated, thus driving the focus-adjusting mechanism. The mechanism moves the movable member vertically, thereby moving the holder up or down. As a result, the revolver is moved vertically, whereby the objective is so moved, achieving focus If the specimen is a heavy one, the stage is put on the base, so that the stage and the base cooperate to support the heavy specimen steadily. The specimen, though heavy, is supported steadily, and can be observed with good focusing. Since the revolver, not the arm top as a whole, is moved vertically along with the movable member, the load on the arm top is relatively small, making it possible to mount a heavy device (e.g., a camera) on the arm top. Further, since the movable member attached to the arm body is moved, too, the optical axis of the objective is not so deviated from that of the eyepiece, as in the case where only the revolver is vertically.

To move the stage to achieve focus adjustment, the holder supporting the stage is attached to the movable member, and the revolver holding the objective is attached to the holder of the arm top. As the focus adjustment is rotated, thus driving the focus-adjusting mechanism, the movable member is moved, whereby the stage is moved vertically, bringing the specimen toward or away from the objective.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will now be described, with reference to the accompanying drawings.

Figure 1:
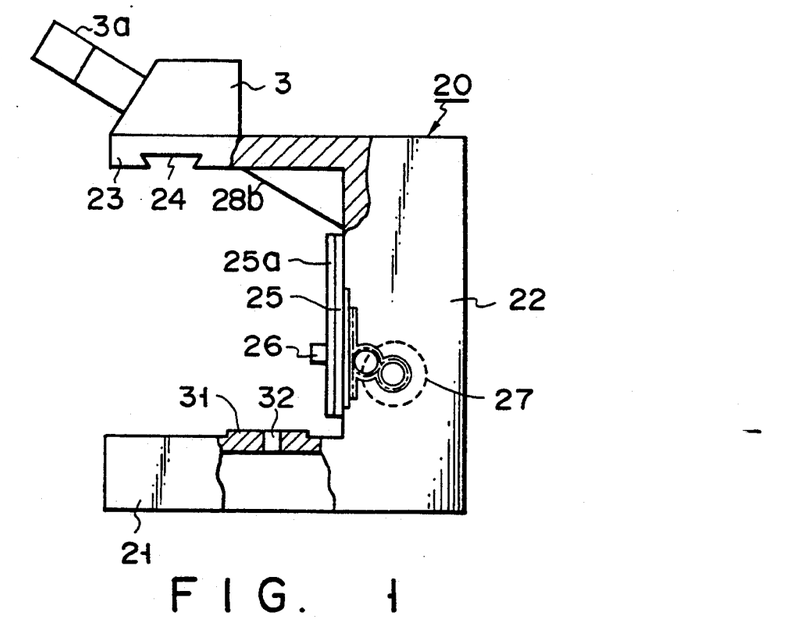
FIG. 1 is a side view showing the main unit of a microscope according to a first embodiment of the invention.

FIGS. 1 to 4 show a microscope according to a first embodiment of the invention. As shown in FIG. 1, the microscope comprises a main unit 20. The main unit 20 comprises a base 21, an arm body 22, and an arm top 23. The top of the arm top 23 is flat. A dovetail groove 24 is formed in the lower surface of the arm top 23. The base 21 is a hollow block and has a seat 31. The seat 31 has a through hole 32.

The microscope further has a lens barrel 3, a movable support 25, a positioning pin 26, a focus adjustment knob 27, and a focus-adjusting mechanism (not shown). The barrel 3 is secured to the top of the top arm 23. The support 25 is mounted on the front of the arm body 22 and can move up and down. The movable support 25 has a vertical dovetail tenon 25a formed on its front. The positioning pin 26 protrudes from the front of the support 25. The focus adjustment knob 27 is mounted on one side of the arm body 22.

The focus-adjusting mechanism is located within the main unit 20 and is coupled to the movable support 25. The mechanism is connected to the focus adjustment knob 27. It comprises a rack extending in vertical direction and a pinion set in engagement with the rack. The rack is fastened to the movable support 25, and the pinion is connected to the focus adjustment knob 27. Hence, the mechanism drives the support 25 upwards and downwards as the knob 27 is rotated in one direction and the opposite direction.

Two rectangular brackets 28a and 28b (only the bracket 28b is shown in FIG. 1) are fixed in the corner defined by the arm body 22 and the arm top 23, thus rendering the arm top 23 rigid. The brackets 28a and 28b are parallel to each other and so positioned that the upper end of the movable support 25 can move into the space between the brackets 28a and 28b. The support 25 can therefore have a sufficient focusing stroke.

Figure 2:
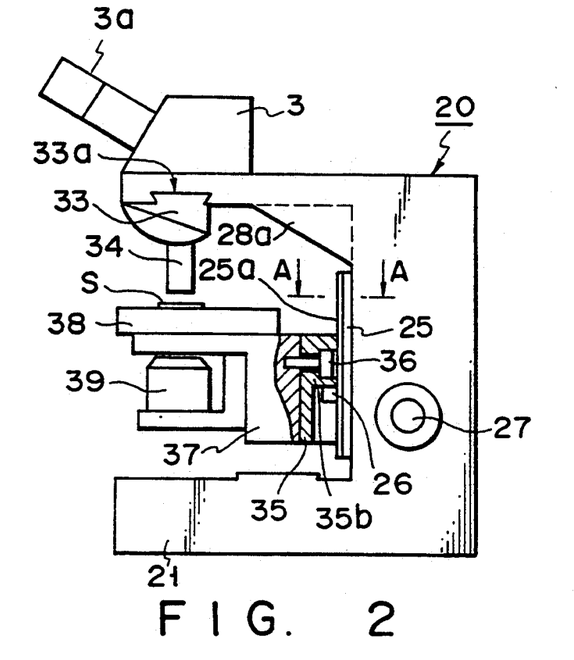
FIG. 2 is a side view of the microscope set in the mode wherein the stage is moved to achieve focusing.
Figure 3:
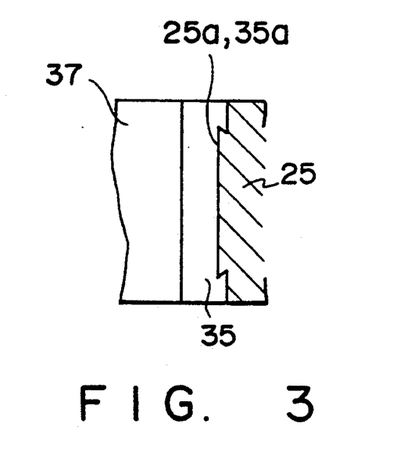
FIG. 3 is a cross-sectional view, taken along line A—A in FIG. 2.

As is shown in FIG. 2, the microscope further comprises a revolver 33, an objective 34, a stage holder, and a stage 38. The revolver 33 has a dovetail tenon 33a. The objective 34 is attached to the revolver 33. The stage holder comprises an adapter 35 and a support 37. The adapter 35 has a thick portion 35b, and is fastened to the support 37 by a screw 36. As is shown in FIG. 3 which is a cross-sectional view taken along line A—A in FIG. 2, the thick portion 35b of the adapter 35 has a dovetail groove 35a formed in that surface facing away from the support 37.

FIG. 2 shows the microscope set in an operating mode (hereinafter called "stage-moving mode"), in which the stage 38 is moved to achieve focusing. To operate the microscope in the stage-moving mode, the dovetail tenon 33a of the revolver 33 is fitted into the dovetail groove 24 of the arm top 23, and the revolver 33 is thereby connected to the arm top 23. Next, the revolver 33 is rotated, placing the objective 34 on the viewing axis of the microscope. Then, the stage holder is mounted onto the movable support 25, with the dovetail tenon 25a of the support 25 fitted in the dovetail groove 35a of the adapter 35. The stage holder is thereby connected to the support 25. The thick portion 35b of the adapter 35 abuts on the positioning pin 26 protruding from the front of the movable support 25, whereby the stage holder is set at a predetermined position with respect to the support 25. The pin position of the positioning pin 26 can be changed by an operator. Next, the stage 38 is put on the upper surface of the support 37, and a specimen S is placed on the stage 38. A condenser mount is fixed to the lower surface of the support, and a condenser 39 is placed on the mount, with its axis aligned with the viewing axis of the microscope. The condenser 39 can therefore gather the light applied from the light source (not shown) provided within the base 21 and applies the light to the specimen S through holes (not shown) made in the support 37 and the stage 38, thereby illuminating the specimen S.

Figure 4:
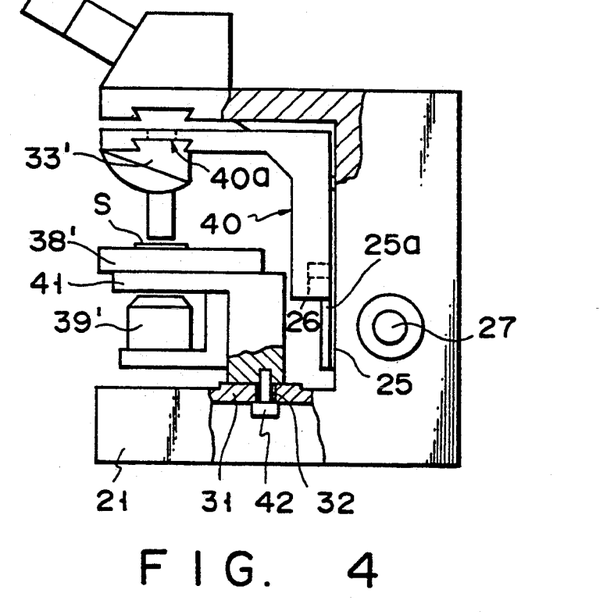
FIG. 4 is a side view showing the microscope set in the mode wherein the objective is moved to achieve focusing.

FIG. 4 shows the microscope set in another operating mode (hereinafter called "objective-moving mode" in which the objective 34 is moved to achieve focusing. To set the microscope in the objective-moving mode, a revolver holder 40 is attached to the movable support 25, and a stage fastener 41 is secured to the base 21.

The revolver holder 40 has a substantially L-shaped cross section, and comprises a horizontal member and a vertical member. The horizontal member has a dovetail groove 40a in the lower surface. A revolver 33' is connected to the revolver holder 40, with its tenon fitted in the dovetail groove 40a of the holder 40. The vertical member has a dovetail groove (not shown) in that surface facing the movable support 25. The holder 40 is mounted onto the support 25, with the dovetail tenon 25a of the support 25 fitted in the dovetail groove of the holder 40. The revolver holder 40 is thereby connected to the movable support 25. The lower end of the vertical member abuts on the positioning pin 26 protruding from the support 25, whereby the stage fastener is set at a predetermined position with respect to the movable support 25.

The stage fastener 41 has a L-shaped cross section, like the revolver holder 40. It is fastened at its lower end to the base 21 by a screw 42. A stage 38' is mounted on the upper surface of the stage fastener 41. A specimen S is put on the stage 38'. A condenser mount is fixed to the lower surface of the support, and a condenser 39' is placed on the mount, with its axis aligned with the viewing axis of the microscope. The condenser 39' can therefore gather the light applied from the light source provided within the base 21 and applies the light to the specimen S through holes (not shown) made in the stage fastener 41 and the stage 38', thereby illuminating the specimen S.

The microscope is set in the stage-moving mode when the specimen S is light, or when the microscope needs to have a long focusing stroke. In other words, the stage holder and the revolver 33 have been attached to the movable support 25 and the arm top 23, respectively. Thereafter, as the focus adjustment knob 27 is rotated in one direction or the other, the focus-adjusting mechanism drives the stage 38 upwards or downwards, thereby accomplishing focusing.

The microscope is set in the objective-moving mode when the specimen S is heavy. More specifically, as is shown in FIG. 4, the revolver holder 40 is attached to the support 25, and the stage fastener 41 is secured to the seat 31 of the base 21. Since the sage fastener 41 is fixed directly to the case 21, it is rigid enough to support the heavy specimen S steadily. Since the objective 34 can easily be moved toward and away from the specimen S, it is easy to perform focusing.

In the embodiment shown in FIGS. 1 to 4, the stage holder which is a movable member is attached to the movable support 25 when the specimen S is relatively light, and the revovler holder 40, also a movable member, is attached to the movable support 25 when the specimen S is relatively heavy. In either case, the support 25 is moved vertically as the focus adjustment knob 27 is rotated in one direction or the other, thereby moving the specimen S toward or away from the objective 34, or moving the objective 34 toward or away from the stage 38'.

As has been described, in the stage-moving mode, the revovler 33 is attached to the arm top 23; in the objective-moving mode, the revolver 33' is attached to the revolver holder 40. Since both the arm top 23 and the revolver holder 40 are rigid enough to hold the revolver, the objective 34 is held steadily, making it possible to perform accurate focusing, whether the microscope is set in the stage-moving mode when the specimen S is a light one, or the objective-moving mode when the specimen S is a heavy one.

Moreover, the microscope is advantageous in that the stages 38 and 38' can be one and the same, so can the condensers 39 and 39', and so can the revolvers 33 and 33'. Needless to say, the objective 34 can be used in both the stage-moving mode and the objective-moving mode.

Figure 5:
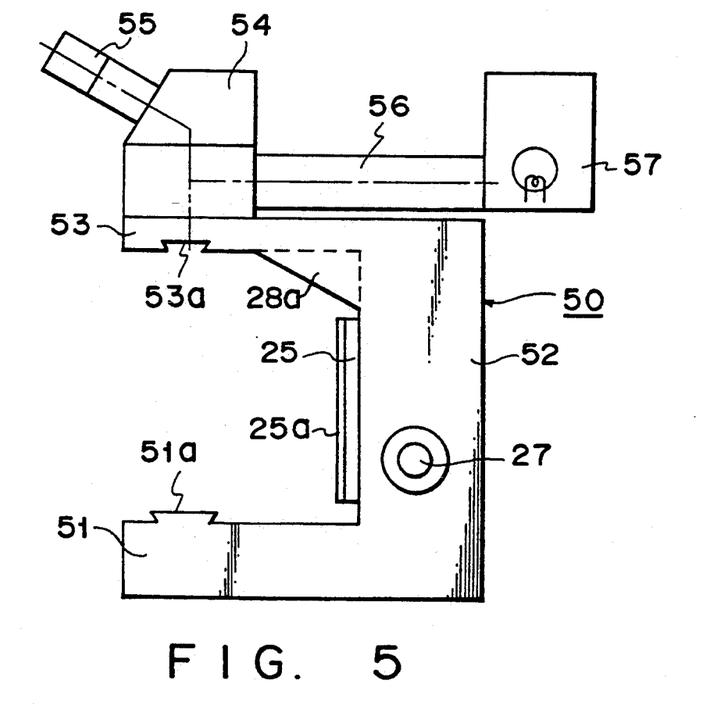
FIG. 5 is a side view showing the main body of a microscope according to a second embodiment of the invention.

FIGS. 5 to 8 show a microscope according to a second embodiment of the invention. As is shown in FIG. 5, the microscope comprises a main unit 50, which in turn comprises a base 51, an arm body 52, and an arm top 53. The base 51 has a dovetail tenon 51a on its upper surface. A movable support 25 is mounted on the front of the arm body 52. The support 25 of the same type as the one used in the first embodiment, and has a vertical dovetail tenon 25a formed on its front. The arm top 53 has a dovetail groove 53a in its lower surface. A focus adjustment knob 27 is mounted on one side of the arm body 52 and connected to a focus-adjusting mechanism (not shown) which is located within the arm body 52 and of the same type as the one used in the first embodiment. Hence, the mechanism drives the support 25 upwards and down wards as the knob 27 is rotated in one direction and the opposite direction.

Figure 6:
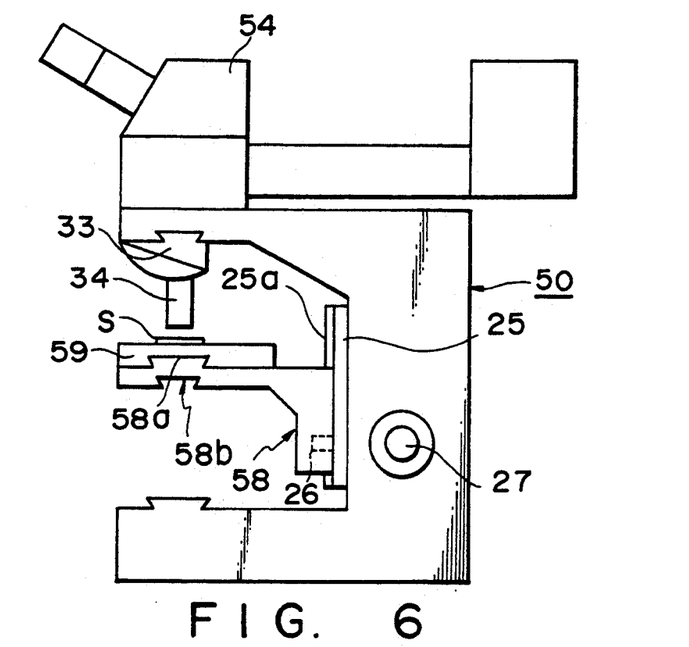
FIG. 6 is a side view showing the microscope of FIG. 5, which is set in the mode wherein the stage is moved to achieve focusing.

As is shown in FIGS. 5 and 6, the microscope further has a lens barrel 54, an eyepiece 55, a reflected flood tube 56, a lamp housing 57. The lens barrel 54 is secured to the top of the top arm 53, and contains the eyepiece 55 which has an optical axis aligned with the viewing axis of the microscope. The reflected flood tube 56 is connected, at one end, to the lens barrel 54 and, at the other end, the lamp housing 57. The housing 57 contains are illumination lamp (not shown). The tube 56 guides illumination light from the lamp to the lens barrel 54.

Figure 8:
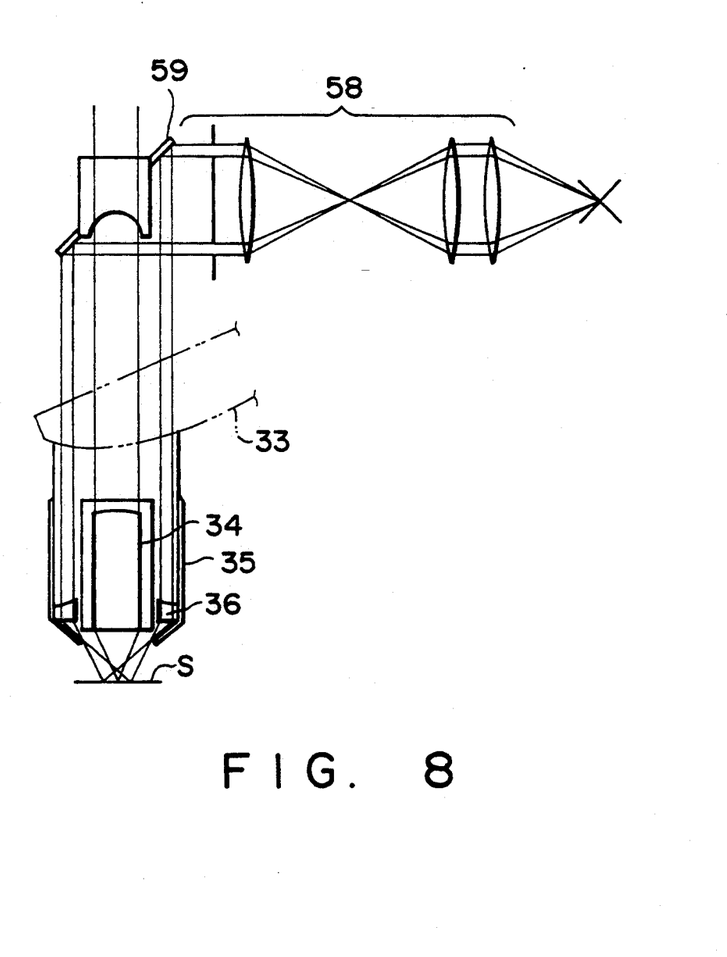
FIG. 8 is a schematic representation of the illumination system incorporated in the microscope shown in FIG. 5.

The microscope has a reflected flood system of the type shown in FIG. 8. This system comprises a set of lenses 60 contained in the reflected flood tube 57, a ring mirror 61 located within the lens barrel 54, and a ring lens 36 located in a barrel 35 which also contains an objective 34. The light beams emitted by the lamp (not shown) pass through the lenses 60 into the lens barrel 54. In the barrel 54, the ring mirror 61 reflects the light beam by 90°. The light beams, thus reflected, pass through the annular space between the objective 34 and the inner surface of the barrel 35, illuminating a specimen S.

As is shown in FIG. 5, two rectangular brackets 28a and 28b are fixed in the corner defined by the arm body 52 and the arm top 53, thus rendering the arm top 53 rigid. The brackets 28a and 28b are parallel to each other and so positioned that the upper end of the movable support 25 can move into the space between the brackets 28a and 28b. The support 25 can therefore have a sufficient focusing stroke.

FIG. 6 shows the microscope set in the stage-moving mode, in which a stage 59 is moved to achieve focusing. To operate the microscope in the stage-moving mode, the dovetail tenon of a revolver 33 is fitted into the dovetail groove 53a of the arm top 53, where by the revolver 33 is connected to the arm top 53. Next, a stage/ revolver holder 58 is attached to the movable support 25. More specifically, the holder 58 is mounted on the movable support 25, with the dovetail tenon 25a of the support 25 fitted in the dovetail groove (not shown) of the stage/revolver holder 58. Then, the stage 59 is mounted on the stage/revolver holder 58, with the dovetail tenon 58a of the holder 58 fitted in the dovetail groove made in the lower surface of the stage 59. The specimen S is placed on the stage 59.

Figure 7:
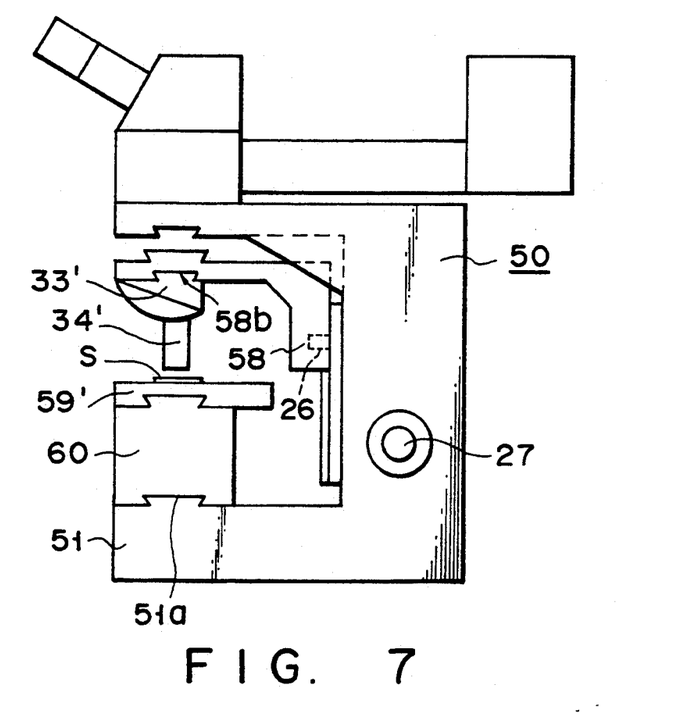
FIG. 7 is a side view showing the microscope of FIG. 5, which is set in the mode wherein the objective is moved to achieve focusing.

FIG. 7 sows the microscope set in the objective-moving mode, in which the objective 34 is moved to achieve focusing. To set the microscope in the objective-moving mode, a revolver 33α is attached to the stage/revolver holder 58, with its dovetail tenon fitted in the dovetail groove 58b of the holder 58. Further, a stationary stage fastener 60 is connected to the base 51, with the dovetail tenon 51a of the base 51 fitted in the dovetail groove made in the lower surface of the fastener 60. Next, a stage 59' is fixed to the stage fastener 60, with the dovetail tenon of the fastener 60 fitted in the dovetail groove made in the lower surface of the stage 59'. Finally, a specimen S is put on the stage 59'.

As has been described, the stage/revolver holder 58 is fixed to the movable support 25 in both the stage-moving mode and the objective-moving mode. In either mode, the holder 58 is moved vertically as the focus adjustment know 27 is rotated in one direction or the other, thereby moving the stage 59 toward or away from the objective 34, or moving the objective 34 toward or away from the stage 59'.

As has been described, in the second embodiment, the specimen S is illuminated with the light beams applied by means of the reflected flood system shown in FIG. 8. Hence, the second embodiment requires no condensers at all.

Moreover, the second embodiment is advantageous in that its operating mode can easily be switched, from the stage-moving mode to the objective-moving mode, or vice versa, since the revolver can be attached to the arm top 53 or the stage/revolver holder 58, and the stage can be attached to the stage/revolver holder 58 or the stage fastener 60.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general invention concept as defined by the appended claims and their equivalents.

What is claimed is:

1. A microscope apparatus comprising:
   a main unit including a base, an arm body mounted on and fixed to the base, an arm top formed on a top of the arm body, a first revolver holder secured to a lower surface of the arm top, a revolver attachable to the first revolver holder, an objective lens means attached to the revolver, a lens barrel held by an upper surface of the arm top, and an eyepiece attached to the lens barrel;
   a stage for supporting a specimen;
   a movable member connected to the front of the arm body and capable of moving in a vertical direction;
   a revolver support having a second revolver holder to which the revolver is attachable, said revolver support being attachable to the movable member;
   a stage support attachable to the movable member for supporting the stage;
   a focus adjustment knob coupled to the arm body; and
   a focus-adjusting mechanism located within the arm body, said focus-adjusting mechanism being mechanically connected to said movable member and to said focus adjustment knob, for driving the movable member in the vertical direction when said focus adjustment knob is rotated,
   wherein, when the revolver support is attached to the movable member, the stage support is mounted on the base, and when the stage support is attached to the movable member, the revolver is attached to the first revolver holder.

2. A microscope apparatus according to claim 1, further comprising a lamp housing containing a lamp for emitting light for illuminating the specimen, and a flood tube located between the lamp housing and said lens barrel, for guiding the light from the lamp housing into said lens barrel.

3. A microscope apparatus according to claim 1, further comprising a condenser, supported on the stage support, for applying illumination light to the specimen from below.

4. A microscope apparatus according to claim 1, further comprising a positioning member attached to said movable member, for supporting one of the revolver support and the stage support attached to the movable member and for preventing from moving at least downwards.

5. A microscope apparatus according to claim 4, wherein each of said revolver support and stage support has a face on which said positioning member is abuttable.

6. A microscope apparatus according to claim 1, wherein said base has a holder for holding said stage support.

7. A microscope apparatus according to claim 6, wherein said stage support has a lower surface, an upper surface, a first engagement member formed on the lower surface and designed to engage with said base, and a second engagement member formed on the upper surface and designed to engage with said stage.

8. A microscope according to claim 1, wherein said movable member has a dovetail tenon extending in vertical direction, and each of said revolver support and said stage support has a dovetail groove for slideably receiving therein said dovetail tenon of said movable member.

9. A microscope apparatus according to claim 8, further comprising a positioning member attached to said movable member, for supporting said one of the revolver support and the stage support and for preventing said revolver/stage holder from moving at least downwards, and wherein said base has a holder for holding said stage support.

10. A microscope apparatus according to claim 9, further comprising a lamp housing containing a lamp for emitting light for illuminating the specimen, and a flood tube located between the lamp housing and said lens barrel, for guiding the light from the lamp housing into said lens barrel.

11. A microscope apparatus according to claim 9, further comprising a condenser, supported on the revolver stage support for applying illumination light to the specimen from below.

12. A microscope apparatus according to claim 1, wherein said movable member has a dovetail tenon extending in vertical direction, and said each of said revolver support and said stage support has a dovetail groove for slideably receiving therein said dovetail tenon of said movable member.

13. A microscope apparatus according to claim 1, wherein an operation mode is selected between an objective-moving mode in which the objective lens means is moved in a vertical direction to perform focusing and in a stage-moving mode in which the stage is moved in the vertical direction to perform focusing, and the revolver support is attached to the moveable member, the revolver support holds the revolver, and the stage support is fixed on the base in the objective-moving mode, and the stage support is attached to the movable member and the first revolver holder holds the revolver in the stage-moving mode.

14. A microscope apparatus comprising:
a main unit including a base, an arm body mounted on and fixed to the base, an arm top, a revolver attachable to the arm top, an objective lens means attached to the revolver, a lens barrel held by the arm top, and an eyepiece attached to the lens barrel;
a stage attachable to the base, for supporting a specimen;
a movable member connected to the front of the arm body and capable of moving in a vertical direction;
a revolver/stage support to be attached to the movable member and movable in the vertical direction, said support having a revolver holder for holding the revolver and a stage holder for holding the stage;
a focus adjustment knob coupled to the arm body; and
a focus-adjusting mechanism, located within the arm body and mechanically connected to both said movable member and said focus adjustment knob, for driving the movable member in the vertical direction when the knob is rotated;
wherein an operation mode is selected between (a) an objective-moving mode in which the objective lens means is moved in a vertical direction to perform focusing, and (b) a stage-moving mode in which the stage is moved in the vertical direction to perform focusing, with the revolver being attached to the revolver/stage support and the stage being fixed on the base in the objective-moving mode, and the stage being attached to the revolver/stage support and the revolver being attached to the arm top in the stage-moving mode.

15. A microscope apparatus according to claim 14, wherein the revolver holder has a dovetail groove, the revolver has a projection to be fitted in the dovetail groove of the revolver holder, the stage holder has a dovetail tenon, and the stage has a dovetail groove in which the dovetail tenon of the stage holder is to be fitted.

* * * * *